United States Patent [19]
Brassard et al.

[11] Patent Number: 5,346,940
[45] Date of Patent: Sep. 13, 1994

[54] TWO-PART FAST CURING RTV SILICONE FOR FORMED-ON-PART AUTOMOTIVE GASKET

[75] Inventors: David M. Brassard, Aurora; Hans E. Haas, Stow; David W. Friedel, Chesterland, all of Ohio

[73] Assignee: Loctite Corporation, Hartford, Conn.

[21] Appl. No.: 36,496

[22] Filed: Mar. 24, 1993

[51] Int. Cl.$^5$ ................................. C08K 5/54
[52] U.S. Cl. ..................... 524/267; 524/731; 524/588; 524/425; 524/442; 524/445; 524/443; 524/431; 524/430; 524/788; 524/789; 524/783; 524/785; 524/78; 524/779; 528/18
[58] Field of Search ............... 528/18; 524/267, 731, 524/588, 425, 442, 445, 443, 431, 430, 788, 789, 783, 785, 780, 779

[56] References Cited

U.S. PATENT DOCUMENTS

| | | |
|---|---|---|
| 2,843,555 | 7/1958 | Berridge . |
| 3,127,363 | 3/1964 | Nitzche et al. . |
| 3,419,516 | 12/1968 | Tarno et al. . |
| 3,847,848 | 11/1974 | Beers . |
| 4,124,560 | 11/1978 | Herzig . |
| 4,257,932 | 3/1981 | Beers ................. 428/450 |
| 4,673,750 | 6/1987 | Beers et al. . |
| 4,735,979 | 4/1988 | Beers et al. . |
| 4,847,396 | 7/1989 | Beers et al. . |
| 5,093,454 | 3/1992 | Fujimoto et al. ........... 528/901 |

FOREIGN PATENT DOCUMENTS 91107771.7  5/1991  European Pat. Off. .

Primary Examiner—Melvyn I. Marquis
Attorney, Agent, or Firm—Vidas, Arrett & Steinkraus

[57] ABSTRACT

A two-part RTV silicone preapplied compression gasket material for forming compression gaskets in place. The formulation includes a silanol terminated polyorganosiloxane, at least 5% by weight of the formulation of a tri- or tetra- methoxy or enoxy functional silane crosslinker, water, and, a condensation catalyst selected from the group consisting of stannous carboxylate compounds, dimethyl tin (IV) compounds and mixtures thereof. One of the two parts of the formulation includes the water component and the other of said two parts is a dry part and includes the crosslinker component.

The formulation provides fast cure, fast development of compression set resistance and excellent ultimate compression set resistance.

15 Claims, No Drawings

TWO-PART FAST CURING RTV SILICONE FOR FORMED-ON-PART AUTOMOTIVE GASKET

BACKGROUND OF THE INVENTION

RTV silicones have long been used for gasketing applications in which a liquid resin is placed between two mating parts of a fluid conduit system, the parts mated to extrude the gasketing material over the mating surfaces and then the formulation allowed to cure. The flexibility of the resulting gasket is highly suited to the sealing requirements of mated parts, particularly parts of different materials with different coefficients of thermal expansion. Such RTV cured-after-assembly silicones have also been formulated which have good resistance of a wide variety of hostile environments.

RTV silicones have frequently been formulated as automotive engine cured- after-assembly gasketing materials where high temperature aggressive fluids, such as engine coolant and motor oil, created a particularly hostile environment. Examples of silicones formulated for such automotive gasketing applications are described in U.S. Pat. Nos. 4,673,750; 4,735,979 and 4,847,396 to Beers et al; and co-pending application Ser. No. 07/607,571 filed Nov. 1, 1990.

An important part of the environment resistance which these formulations achieve is due to the strong silicone/substrate adhesion developed by particular adhesion promoters in these formulations. However, where removability of the gasket is important, e.g. where gasket replacement may be necessary for maintenance or repair of an assembly, such strong substrate adhesion makes the use of such cured-after-assembly gaskets undesirable. Moreover, cured-after-assembly gaskets may create problems when an excessive amount of RTV is used because uncured fillets may be extruded into fluid passageways where they may contaminate fluids or cure so as to partially or completely block a passageway.

In contrast to liquid cured-after-assembly gaskets, it is also known to utilize preformed compression gaskets as seals between automotive engine parts. Compression gaskets are easily removed and replaced but suffer the disadvantage of an inventory of gaskets must be maintained for each configuration of mating parts. Further, "compression set" is a serious problem with preformed gasket materials. "Compression set" is a loss of resiliency of the gasket material over time as the gasket is maintained under pressure and subjected to high temperature. Sealing function may be irrecoverably lost if pressure is lessened or if the assembly is subjected to relative movement, e.g., because of differential thermal expansion of the mating parts. Common materials used in compression gaskets include soft metals, corks, cork composites and various crosslinked rubbers. Certain heat crosslinked silicone rubbers have also been used. Such rubbers typically have a very high tensile modulus under 100% elongation so that under compression they do not have the flexibility to conform well to uneven surfaces, particularly on mating parts of different materials having different coefficients of thermal expansion.

UV-curable silicones, such as disclosed in U.S. Pat. No. 4,675,346, have been proposed for formulation of formed-on-part compression gaskets which are cured before mating, but such silicones are only practical in assembly operations where UV ovens are available. They are not practical for use as maintenance and repair gaskets and have not found use in automotive engine applications.

Another type of gasketing application has been proposed as a hybrid of the cured-after-assembly and the preformed compression gasket. A liquid resin is preapplied to one of two mating parts as a continuous bead and the second part mated prior to cure. After cure, the bead is compressed. Such a formed-on-part compression gasket has the advantage of eliminating inventory requirements for conventional gaskets and allowing rapid production of custom gaskets, but it introduces a cure time lag in the assembly operation. Moreover, the cured bead material has potentially all the other problems of the conventional compression gaskets.

There is, therefore, a need for a formed-on-part compression gasket material suitable for use as a replacement for conventional pre-formed gaskets in automotive engine application. In particular, the material should be a liquid resin formulation which has a very fast ambient cure time, provides resistance to automotive fluids, is readily removable, and has low compression set. Prior art RTV silicones do not have a suitable combination of these properties.

SUMMARY OF THE INVENTION

The present invention is, in one aspect, an ambient temperature curing silicone formulation which is suited for use as an automotive engine formed-on-part compression gasket material. The formulation has very fast ambient cure speed and compression set resistance. In its preferred embodiments the formulation will be substantially cured within 20 minutes or less after mixing regardless of the thickness of the material. The preferred formulations also have a low cured modulus, very good resistance to hot engine fluids, and are easily peeled from assembled parts for ready replacement and maintenance or repair operations.

The formulation includes a silanol terminated polyorganosiloxane, at least 5% by weight of the formulation of a tri- or tetra- methoxy or enoxy functional silane crosslinker, water, and, a condensation catalyst selected from the group consisting of stannous carboxylate compounds, dimethyl tin (IV) compounds and mixtures thereof. One of the two parts of the formulation comprises the water component and the other of the two parts is a dry part and comprises the crosslinker component.

In one preferred embodiment, the formulation is a two-part silicone formulation in which one of the two parts comprises a trimethylsilyl terminated polydiorganosiloxane having a viscosity in the range of about 100 cst to about 10,000 cst, a tri- or tetra- methoxy or enoxysilane crosslinker at a level between 5 and 10% by weight of the total formulation, the condensation catalyst, and optionally, a dry filler. The other part of the formulation comprises a mixture of a 1000–50,000 cst OH terminated polydiorganosiloxane, water and a filler.

The fast deep cure section of the formulations of the invention is a result of the moisture contained in the formulation, which allows for curing without relying on diffusion of atmospheric moisture through the silicone bead. The quick deep section cure of this hybrid material allows for immediate replacement or customization of compression gaskets regardless of the complexity of their configuration.

A further aspect of the invention is a method of preparing a gasket seal between two mating parts comprising the steps of applying a bead to one of a pair of said mating parts of a mixed two-part formulation of the invention to draw a closed figure thereon, mating the second of said pair of parts to the first prior to cure of the formulation so as to contact the entire figure drawn by said bead without compression, allowing the formulation to cure for a predetermined time from mixing, and then further mating the two parts with compression of the cured bead.

In a still further aspect of the invention there is provided a formed-in-place compression gasket which is the cured product of a composition as described.

DETAILED DESCRIPTION OF THE INVENTION

The silanol terminated polyorganosiloxane used in the formulations of the invention can be any liquid OH terminated polyorganosiloxane polymer, especially those which consist essentially of repeating units of formula

where R is a hydrocarbon or halohydrocarbon group, and which are terminated with hydroxyl radicals. Such polyorganosiloxanes are well known to those skilled in the art. Suitably the polyorganosiloxanes are OH terminated polydimethylsiloxanes which have a viscosity at 25° C. of 1,000 cst –50,000 cst, preferably about 2,000 cst to about 10,000 cst.

Preferably both parts of the formulations of the invention are compounded as liquid or pasty compositions of similar rheology and with volume mix ratios in the range of 2:1–1:1 to facilitate accurate, rapid and thorough mixing of the two parts at the time of use. To accomplish this objective it is necessary that both parts of the formulation include a liquid vehicle component. While it is possible to divide the silanol terminated silicone between both parts as the liquid vehicle, it is very difficult to provide an acceptable shelf life for such formulations. Accordingly, it is preferred that the silanol terminated polyorganosiloxane be limited to one part of the formulation and that an M-stopped silicone fluid, inert to condensation curing, be employed as the vehicle for the second part. This M-stopped fluid is suitably a trimethylsilyl terminated polydimethylsiloxane, but those skilled in the art will know that other inert silicone fluids may also be employed for this purpose. Desirably the M-stopped fluid has a viscosity in the range of about 100–10,000 cst. In the preferred formulations of the invention the level of silanol terminated polyorganosiloxane is typically in the range of about 25–60% by weight and the level of M-stopped silicone fluid is typically in the range of about 10–35%. Mix ratios outside the preferred range may also be employed, for instance in the range of 10:1–1:2.

Fillers will also be typically employed in the compositions of the invention to adjust rheology of the two parts, and to provide desired cured properties, such as strength, modulus, thermal resistance, etc. Examples include fumed silicas, precipitated silicas, calcium carbonate, carbon black, talc, ground quartz, clay, iron aluminum silicate, titanium dioxide, iron oxide and various other metal oxides such as cerium, zinc and barium oxides. Preferred fillers are treated fumed silicas employed at levels of 10–25% by weight of the total formulation. Suitably the silica filler is divided between the two parts as necessary for rheology adjustment. In the preferred automotive gasketing applications iron oxide fillers are also desirably employed for their thermal resistance properties, typically at levels of 1–10% of the total composition weight.

To impart rapid deep section curing properties one part of the formulation contains water. Suitably the level of water is in the range of 0.1–2.0%, preferably 0.5–1.5% by weight of the total formulation. The water content may be supplied directly or in the form of a moisture containing filler, or both. In the preferred formulations the silanol terminated silicone is used as the liquid vehicle for the water containing part of the formulation.

The crosslinker component of the formulation must be kept separate from water until mixing. For this reason the other part of the formulation is made anhydrous and the crosslinker limited to the anhydrous part. Desirably the liquid vehicle and the fillers employed in the anhydrous part are first blended and the blend evacuated in accordance with conventional procedures for removing trace moisture levels before the crosslinker is added to this part of the formulation. The catalyst is also desirably separated from the silanol terminated silicone and the water and therefore is preferably limited to the anhydrous part of the formulation.

The rapid development of compression set in the formulations of the invention is believed to be a feature of the particular combination of catalyst and crosslinkers employed. The methoxy or enoxy functional crosslinkers are employed at relatively high levels of greater than 5%, typically 5–10%, preferably about 6–8% by weight of the formulation. The trimethoxy functional silane crosslinkers are suitably hydrocarbyltrimethoxysilanes, especially alkyl, aryl or alkenyl trimethoxysilanes. Examples of suitable methoxy functional crosslinkers are vinyltrimethoxysilane, methyltrimethoxysilane, phenyltrimethoxysilane and tetramethoxysilane. Trimethoxysilane crosslinkers are preferred because of the toxicity of tetramethoxysilane. Examples of suitable enoxy functional crosslinkers are vinyltriisopropenoxysilane, methyltriisopropenoxysilane, phenyltriisopropenoxysilane and tetraisopropenoxysilane.

The catalysts are stannous carboxylate compounds, such as stannous octoate, stannous naphthenate, etc., or a dimethyl tin (IV) carboxylate compound, such as dimethyltinbis(neodecanoate), dimethyltin maleate, dimethyltin diacetate, etc. Effective amounts of tin catalysts which can be used in the practice of the present invention to facilitate the cure of the room temperature vulcanizable compositions are, for example, from about 0.001% to about 1% based on the total weight of silanol terminated polyorganosiloxane. Typical catalyst levels are about 0.25–0.5% based on the total formulation weight, preferably 0.3–0.4%. Such low catalyst concentrations contribute to the enhanced thermal stability of the cured formulations of the invention.

The formulations of the invention are rapidly curing. Typically they will be substantially cured through a mixed mass within 20 minutes, frequently 5–10 minutes. Surfaces exposed to the atmosphere may remain wet for a while after this time, however. A dry-to-the touch surface usually rapidly follows the deep section cure. The inventive formulations also rapidly develop compression set resistance. As illustrated by the examples, formulations within the invention can readily be prepared which provide a compression set 60% or less within an hour at ambient temperature (25° C.) and optimal formulations can be formulated to provide that degree of compression set resistance within 20 minutes. This is considered to be a very substantial advance over prior art RTV compositions.

The formulations of the invention may further comprise other additives known in the art such as pigments, odor masks or other additives known to improve the properties of RTV silicones for particular applications.

In use in a gasketing application the two parts of the formulation are mixed and applied as a continuous bead of to one of a pair of mating surfaces in a fluid conduit assembly. The bead should completely encircle the inner conduit passageway. Suitably it is applied via a static mixing head. Typical bead thicknesses are from 0.01" (0.25 mm) to about 0.25" (6.35 mm), preferably about 0.03–0.10" (0.8 mm–2.5 mm). The second of the two parts is then mated, contacting the bead without substantial compression as to assure uniform sealing contact of the bead with the second part, but avoid the extrusion of a fillet of the uncured formulation into the passageway. After the formulation has cured sufficiently to develop compression set resistance the bead is then compressed to form the gasket seal.

The invention is illustrated by the following non-limiting examples.

EXAMPLES 1–3

Formulations were prepared as shown in Table I, taking care to assure that the components of the part A compositions were dry before the crosslinker was added and that the part A compositions remained dry after compounding.

Upon mixing parts A and B in a static mixer at a 1:1 ratio, curing is initiated. The formulations are deep section cured within 5–12 minutes. The formulations of Examples 2 and 3 gave dry-to-the-touch surfaces within 15 minutes. Cured properties shown in Table I were measured after 3 days at ambient temperature. Compression set values were determined per ASTM D-395 after cure for the specified time at ambient temperature.

TABLE I

| | Example | | |
|---|---|---|---|
| | 1 | 2 | 3 |
| Formulation PART A | | | |
| OH- terminated polydimethylsiloxane (2000 cst) | 38.00 | 38.00 | 38.00 |
| TS-510 TM treated fumed silica | 8.00 | 8.00 | 8.00 |
| Water | 1.00 | 1.00 | 1.00 |
| PART B | | | |
| Trimethylsilyl terminated polydimethylsiloxane (100 cst) | 31.77 | 29.29 | 26.95 |
| TS-510 TM treated fumed silica | 9.00 | 9.00 | 9.00 |
| Black iron oxide | 6.75 | 6.75 | 6.75 |
| Cerium octoate solution[1] | 0.07 | 0.07 | 0.07 |
| Vinyltrimethoxysilane | 5.00 | 7.50 | 10.00 |
| Dimethyltinbis(neodecanoate) catalyst | 0.30 | 0.30 | 0.30 |
| CURED PROPERTIES | | | |
| Tensile (psi) | 306 | 321 | 335 |
| Elongation (%) | 258 | 161 | 184 |
| Shore A durometer | 24 | 35 | 35 |
| 100% Modulus (psi) | 108 | 201 | 177 |
| COMPRESSION SET (%) | | | |
| 20 Min. | 92.5 | 43.0 | 60.2 |
| 40 Min. | 87.3 | 35.0 | 41.5 |
| 1 Hour | 73.2 | 31.0 | 34.7 |
| 3 Days | 30.1 | 53.0 | 51.0 |

[1] 12% Cerium in mineral spirits.

EXAMPLES 4–6

The formulations shown in Table II were prepared as in the previous example, except that the volume mix ratio of parts A to B was 2:1.

TABLE II

| | Example | | |
|---|---|---|---|
| | 4 | 5 | 6 |
| Formulation PART A | | | |
| OH- terminated polydimethylsiloxane (2000 cst) | 52.31 | 52.31 | 52.31 |
| TS-510 TM treated fumed silica | 10.00 | 10.00 | 10.00 |
| Water | 1.00 | 1.00 | 1.00 |
| PART B | | | |
| Trimethylsilyl terminated polydimethylsiloxane (100 cst) | 17.50 | 15.00 | 12.5 |
| TS-510 TM treated fumed silica | 7.00 | 7.00 | 7.00 |
| Black iron oxide | 6.75 | 6.75 | 6.75 |
| Cerium octoate solution[1] | 0.07 | 0.07 | 0.07 |
| Vinyltrimethoxysilane | 5.00 | 7.50 | 10.00 |
| Dimethyltinbis(neodecanoate) catalyst | 0.30 | 0.30 | 0.35 |
| CURED PROPERTIES | | | |
| Tensile (psi) | 364 | 374 | 274[2] |
| Elongation (%) | 166 | 152 | 92 |
| Shore A durometer | 40 | 43 | 49 |
| 100% Modulus (psi) | 212 | 246 | 298 |
| COMPRESSION SET (%) | | | |
| 20 Min. | 89.4 | 47.0 | 63.0 |
| 40 Min. | 87.3 | 38.0 | 56.2 |
| 1 Hour | 86.3 | 37.0 | 71.0 |
| 3 Days | 37.0 | 51.0 | 61.0 |

EXAMPLES 7–10

The formulations shown in Table III were prepared as in the previous examples. The volume mix ratio of parts A to B was 1:1.

TABLE III

| | Example | | | |
|---|---|---|---|---|
| | 7 | 8 | 9 | 10 |
| Formulation PART A | | | | |
| OH- terminated polydimethylsiloxane (2000 cst) | 39.86 | 39.86 | 39.86 | 38.00 |
| TS-510 TM treated fumed silica | 5.00 | 5.00 | 5.00 | 8.00 |
| Water | 1.00 | 1.00 | 1.00 | 1.00 |
| PART B | | | | |
| Trimethylsilyl terminated polydimethylsiloxane (100 cst) | 32.02 | 32.02 | 32.02 | 31.88 |
| TS-51 TM treated fumed silica | 10.00 | 10.00 | 10.00 | 9.00 |
| Black iron oxide | 6.75 | 6.75 | 6.75 | 6.75 |
| Cerium octoate solution | 0.07 | 0.07 | 0.07 | 0.07 |
| Phenyltrimethoxysilane | 5.00 | | | |
| Methyltrimethoxysilane | | 5.00 | | |
| Vinyltrimethoxysilane | | | 5.00 | |
| Vinyltriisopropeneoxysilane | | | | 5.00 |
| Dimethyltinbis(neodecanoate) catalyst | 0.30 | 0.30 | 0.30 | 0.30 |
| CURED PROPERTIES | | | | |
| Tensile (psi) | 296 | 251 | 243 | 392 |
| Elongation (%) | 181 | 147 | 145 | 253 |
| Shore A durometer | 30 | 30 | 30 | 28 |
| 100% Modulus (psi) | 158 | 161 | 160 | 142 |
| COMPRESSION SET (%) | | | | |

TABLE III-continued

| | Example | | | |
|---|---|---|---|---|
| | 7 | 8 | 9 | 10 |
| 3 Days | 32 | 29 | 35 | 27 |

COMPARATIVE EXAMPLES

The formulations shown in Tables IV and V were prepared as in the previous examples. The volume mix ratio of parts A to B was 1:1.

TABLE IV

| | Comparative Examples | | | | |
|---|---|---|---|---|---|
| | A | B | C | D | E |
| Formulation | | | | | |
| PART A | | | | | |
| OH- terminated polydimethyl-siloxane (2000 cst) | 36.68 | | | | |
| OH- terminated polydimethyl-siloxane (6000 cst) | | 34.18 | 34.18 | 23.46 | 23.46 |
| TS-510 ™ treated fumed silica | 8.00 | 8.00 | 8.00 | 10.43 | 10.43 |
| Red iron oxide | | | | 7.04 | 7.04 |
| Mixed tetraoximosilane and vinyltrioximosilane (1:1 wt ratio) | 2.50 | | | | |
| Tetraethoxysilane | | | 5.00 | 11.16 | |
| ES-40 ™ partially condensed tetraethoxysilane | | 5.00 | | | 11.16 |
| PART B | | | | | |
| Trimethylsilyl terminated polydimethylsiloxane (100 cst) | 35.63 | 35.63 | 35.63 | | |
| OH- terminated polydimethyl-siloxane (2000 cst) | | | | 35.57 | 35.57 |
| TS-510 ™ treated fumed silica | 9.00 | 9.00 | 9.00 | 6.71 | 6.71 |
| Black iron oxide | 6.75 | 6.75 | 6.75 | | |
| Cerium octoate solution | 0.07 | 0.07 | 0.07 | 0.07 | 0.07 |
| Water | 1.00 | 1.00 | 1.00 | 0.48 | 0.48 |
| Dibutyl tin diacetate | 0.10 | 0.37 | 0.37 | 0.36 | 0.36 |
| Calcined silane treated clay | | | | 4.79 | 4.79 |
| COMPRESSION SET (%) | | | | | |
| 20 Min. | 109.2 | 113.4 | 113.0 | 97.3 | |
| 1 Hour | | 97.3 | 106.0 | 45.7 | 83.4 |
| 3 Days | 65.8 | | | | |

Comparative examples B, C, D and E, while providing undesireably slow development of compression set resistance, do give rapid deep section cure with tack-free surfaces and thus are considered useful as molding materials.

TABLE V

| | Comparative Example | |
|---|---|---|
| | F | G |
| Formulation | | |
| PART A | | |
| OH- terminated polydimethylsiloxane (6000 cst) | 31.89 | 31.89 |
| TS-510 ™ treated fumed silica | 9.00 | 9.00 |
| Methyltrimethoxysilane | 5.00 | |
| Phenyltrimethoxysilane | | 5.00 |
| PART B | | |
| Trimethylsilyl terminated polydimethylsiloxane (100 cst) | 35.49 | 35.49 |
| TS-510 ™ treated fumed silica | 9.00 | 9.00 |
| Black iron oxide | 6.75 | 6.75 |
| Water | 1.00 | 1.00 |
| Dibutyl tin diacetate catalyst | 0.37 | 0.37 |
| CURED PROPERTIES | | |
| Tensile (psi) | 336 | 385 |
| Elongation (%) | 194 | 309 |
| Shore A durometer | 32 | 26 |
| 100% Modulus (psi) | 175 | 115 |
| COMPRESSION SET (%) | | |
| 3 Days | 68.9 | 57.5 |

What is claimed is:

1. A fast curing two-part RTV silicone formulation comprising:
   a silanol terminated polyorganosiloxane;
   at least 5% by weight of the formulation of a tri- or tetra- methoxy or enoxy functional silane crosslinker;
   water; and,
   a condensation catalyst selected from the group consisting of stannous carboxylate compounds, dimethyl tin (IV) compounds and mixtures thereof, the water being present in a first of said two parts and the second of said two parts being free of water and comprising said crosslinker component.

2. A formulation as in claim 1 wherein the said first part further comprises said silanol terminated polyorganosiloxane and said second part further comprises said condensation catalyst and a tri-methylsilyl terminated polyorganosiloxane.

3. A formulation as in claim 2 further comprising one or more fillers.

4. A formulation as in claim 3 wherein the stoichiometry thereof is adjusted to provide a mix ratio of the two parts of between 10:1 and 1:2, volume basis.

5. A fast curing two-part RTV silicone formulation comprising:
   a silanol terminated polyorganosiloxane;
   at least 5% by weight of the formulation of a tri- or tetra- methoxy or enoxy functional silane crosslinker;
   water; and,
   a condensation catalyst selected from the group consisting of stannous carboxylate compounds, dimethyl tin (IV) compounds and mixtures thereof, the water being present in a first of said two parts and said first part further comprising said silanol terminated polyorganosiloxane and the second of said two parts being free of water and comprising said crosslinker component, said condensation catalyst and a tri-methylsilyl terminated polyorganosiloxane,
   the composition further comprising one or more fillers, and
   the stoichiometry of the formulation is adjusted to provide a mix ratio of the two parts of 2:1-1:1.

6. A formulation as in claim 1 having an ambient temperature deep section cure time of less than 20 minutes.

7. A formulation as in claim 1 providing a compression set between two mated parts of less than 60% after 1 hour cure at 25° C. prior to compression.

8. A formulation as in claim 7 wherein the compression set is less than 60% after 20 minute cure at 25 ° C. prior to compression.

9. A fast curing two-part RTV silicone formulation, the first part comprising a silanol terminated polyorganosiloxane having a viscosity in the range of about 1000 cst to 50,000 cst; water; and a filler, and the second part comprising at least 5% by weight of the total formulation of a tri- or tetra- methoxy or enoxy functional silane crosslinker; an effective amount of a condensation catalyst selected from the group consisting of stannous carboxylate compounds, dimethyl tin (IV) compounds and mixtures thereof; and a tri-methylsilyl terminated polyorganosiloxane having a viscosity in the range of about 100 cst to about 10,000 cst.

10. A formulation as in claim 9 wherein the second part comprises at least one dry filler.

11. A formulation as in claim 9 wherein the crosslinker is a tri- or tetra-methoxy functional silane.

12. A formulation as in claim 9 wherein the crosslinker is a tri- or tetra- enoxy functional silane.

13. A formulation as in claim 9 wherein the crosslinker is selected from the group consisting of vinyltrimethoxysilane, methyltrimethoxysilane, phenyltrimethoxysilane, tetramethoxysilane vinyltriisopropenoxysilane, methyltriisopropenoxysilane, phenyltriisopropenoxysilane and tetraisopropenoxysilane.

14. A formulation as in claim 1 wherein the crosslinker is selected from the group consisting of vinyltrimethoxysilane, methyltrimethoxysilane, phenyltrimethoxysilane, vinyltriisopropenoxysilane, methyltriisopropenoxysilane and phenyltriisopropenoxysilane.

15. A formulation as in claim 7 wherein the crosslinker is a trimethoxy functional silane.

* * * * *